United States Patent Office 3,703,502
Patented Nov. 21, 1972

3,703,502
PROCESS FOR ISOLATING ORGANIC COMPOUNDS DISSOLVED IN AN ORGANIC SOLVENT
Dirk J. Venderbos and Laurentius L. van Dierendonck, Geleen, Netherlands, assignors to Stamicarbon N.V., Heerlen, Netherlands
Continuation of application Ser. No. 803,262, Feb. 28, 1969. This application Aug. 21, 1970, Ser. No. 66,102
Claims priority, application Netherlands, Feb. 28, 1968, 6802774
Int. Cl. C08f 47/22, 47/00
U.S. Cl. 260—80.78
5 Claims

ABSTRACT OF THE DISCLOSURE

There is provided a process for isolating organic compounds, including polymers or copolymers from an organic solution thereof. The organic solution is introduced into a vortex chamber at a point adjacent to the periphery of the cylindrical side wall of the vortex chamber wherein it is brought in contact with a vortex flow of water of a temperature near the boiling point of the solvent under the prevailing pressure. The organic solution of which the specific gravity has to be lower than that of water is dispersed in the water phase at a point away from the interface between the liquid and the hollow core in the vortex flow. To increase the specific gravity, dissolved salts or suspended substances may be added to the water phase. The organic solution may be added to the water immediately before it enters the vortex flow or may be supplied through an axially or radially disposed feed pipe to the water phase of the vortex flow.

Figure 1:
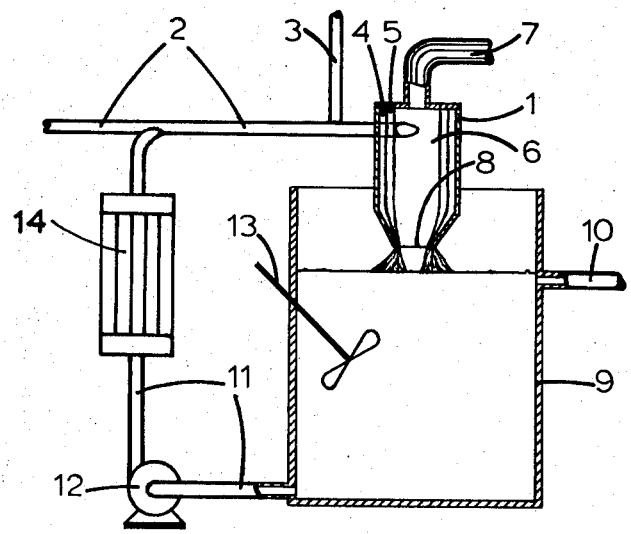

This application is a continuation of application Ser. No. 803,262 filed Feb. 28, 1969 now abandoned.

The invention relates to process by which organic compounds, including polymers or copolymers, dissolved in an organic solvent, are isolated by bringing the said solution into contact with a vortex flow of water of such a temperature near the boiling point of the solvent at the prevailing pressure that the solvent is evaporated.

A number of organic compounds, including polymers or copolymers, such as polymers of diolefins like polybutadiene and polyisoprene and also copolymers of ethylene with at least one other alkene and/or at least one polyunsaturated compound, show a strong tendency to agglomeration, and adhesion to the apparatus as soon as the solvent has been wholly or partly withdrawn from them. For further processing it is endeavoured to recover said polymers or copolymers in the form of small, readily removable particles.

According to a known process this can be achieved, without undue trouble from sticky particles, by bringing the dissolved polymer into hot water. While the solid particles thus formed are kept suspended in the hot water by means of stirrers, which may be fitted with knives if so desired, the solvent contained in them is removed by evaporation. This process has the drawback that a considerable amount of water vapour is withdrawn together with the solvent vapour. For, the solvent is released in bubble-form via the water phase, with the vapour pressure in the bubbles being the total sum of the partial vapour pressures of the solvent and the water. A direct consequence of this is that more hot water (in the form of steam) has to be supplied than is needed for evaporating the solvent alone. This implies that the known process has an unfavourable heat economy. Further, a relatively large installation is needed, while the intensive agitation of the suspension requires a high energy input. Another drawback is that auxiliary substances must be supplied for keeping the solid particles in suspension and/or for promoting the stirring effect.

Agglomerization and sticking of the polymer crumbs to the apparatus can be avoided by using the process according to Dutch patent specification 107263. According to this process, water is supplied to a vortex chamber under such pressure as will produce a vortex flow therein, while the organic solution is admitted to the vortex chamber along or near the axis of the vortex flow in the aforesaid chamber. The organic solution will thus be contacted with the hot water on the interface between the water and the hollow core in the vortex flow, while the water is enclosed between the organic phase and the chamber wall so that sticking is prevented. The transfer of heat from the hot water to the organic solution at the interphase is insufficient, so that it is not possible in the vortex chamber already to effect practically complete removal of the solvent from the polymer. Remaining solvent must therefore be removed in another unit. The installation according to the Belgian patent specification 558,227, FIG. 6, has the same drawback. In the process outlined there, the organic phase is also contacted via a central inlet with the surface of a vortex flow of water that moistens the wall of the installation.

According to the present invention, the organic phase, whose specific gravity is lower that that of water, is dispersed in the water phase at a point away from the interphase between the liquid and the hollow core in the vortex flow. So, the organic phase is first dispersed in the hot water, to be subsequently removed from it under the influence of the centrifugal force in the vortex chamber. The dispersion step ensures fast and effective transfer of heat from the water to the solvent to be evaporated, so that the latter can readily evolve from the light organic phase around the hollow vortex core and issue through said core. With the solvent evaporated into the core exclusively via the organic phase, hardly any water in vapour form is withdrawn during the evaporation of the solvent because the vapour pressure in the vapour bubbles formed is not higher than the vapour pressure of the solvent. Consequently, the heat losses are low; the hot water yields only the heat needed for the substantially complete evaporation of the solvent in the vortex chamber. A fundamental difference with the known procedures is thus that in the process according to the present invention the organic phase is not introduced in the centre of the vortex flow.

If the water phase and the organic phase differ only slightly in specific gravity, substances increasing the specific gravity, such as soluble salts or suspended substances, may be added to the water.

Examples of substances to which the process according to the invention may be applied are polymers of diolefins, i.a. polybutadiene and polyisoprene, as well as copolymers of ethylene with at least one other alkene and/or at least one polyunsaturated compound. Such copolymers include both saturated copolymers which, in addition to ethylene, contain one or several alkenes, e.g. propylene, butylene-1, pentene-1, hexene-1, 4-methylpentene-1, isobutylene, styrene or α-methylstyrene, and unsaturated copolymers, composed of ethylene, another alkene, preferably propylene and a polyunsaturated compound, e.g. butadiene, isoprene, pentadiene-1, 4-hexadiene-1,4, monovinylcyclohexene, cylopentadiene, dicyclopentadiene, cyclooctadiene, 5 - alkenyl - 2 - norbornenes, 5-alkylidene, 2-norbornenes, 2-alkyl 2,5-norbornadienes, 4,7,8,9-tetrahydroindene and bicyclo 4,2,0-octadiene-3,7. Solvents to be used with the above substances are i.a. hexane, heptane, petrol, kerosene, benzene and the like.

The invention is particularly suited for isolating ethylene-propylene-dicyclopentadiene terpolymers, or related polymers, from an organic solvent, such as hexane. Normally, the process according to the invention can be applied to those cases where for the evaporation of organic solvents the high heat transfer between two liquid phases can be turned to good advantage. The process may be used, for example, for evaporating benzene from a solution of caprolactam in benzene obtained from a caprolactam purification process. In that case, the recycling hot water is saturated with caprolactam while, preferably, a salt like ammonium sulphate is added to the water both for increasing the specific gravity of the water phase and for diminishing the solubility of the caprolactam. Another application of the process according to the invention is in the removal of volatile substances from highly sticky tarry products.

The invention will now be elucidated with reference to two examples.

EXAMPLE I

Suppose that an ethylene-propylene-dicyclopentadiene terpolymer is dissolved in hexane in the proportion of 1 kg. of terpolymer to 14 kgs. of hexane. The hexane is removed at 81° C. At this temperature the saturation vapour pressure of water equals 0.51 kg./cm.$^2$, so that at an overall pressure of 1 kg./cm.$^2$ the vapour pressure of the hexane in the bubbles equals 0.49 kg./cm.$^2$. The water vapour then has a density of 0.32 kg./m.$^3$, the figure for hexane being 1.45 kg./m.$^3$. The amount of water escaping in the bubbles per kg. of hexane now equals 0.32/1.45=0.22 kg., which is equivalent to a heat loss of 120 kcals. per kg. of evaporated hexane. With the process according to the invention being carried out at the same water temperature and the same atmospheric pressure, the experimental heat and mass balances gave a heat consumption of 85 kcals. per kg. of hexane. Since the heat of evaporation of hexane is 80 kcals. per kg., the heat loss is only 5 kcals. per kg. of hexane, which is 115 kcals. per kg. of hexane less than in the known process.

EXAMPLE II

When the process is carried out at 92° C., the difference with the known process is even greater. The calculated loss in a stirred vessel is 0.63 kg. of water per kg. of hexane, or 350 kcals. per kg. of hexane. The experimentally determined heat loss in the process according to the invention at the abovementioned temperature equals 95 kcals. per kg. of hexane, which is 255 kcals. per kg. of hexane less than in the known process.

The process according to the invention is preferably carried out in a vessel fitted with a tangentially disposed water feed pipe. The velocity and, hence, the volume of the infed water must be large enough to produce the required vortex flow and a hollow core in the vortex chamber. It may be necessary for this purpose to recycle all or part of the water, which operation must, of course, be preceded by partial or complete removal of the suspended particles.

The organic solution may be added to the water in various ways. The result desired can be achieved in two ways, i.e. by adding the solution to the water phase immediately before the latter enters the vessel, or by feeding the solution through an axially, or radially but not centrally disposed inlet to the water in the vessel.

The invention will be further elucidated with reference to a drawing of an installation for executing the process. FIG. 1 gives a schematic survey of the installation, while FIGS. 2, 3, 4 and 5 show some possible variation of it. According to FIG. 1, hot water is supplied via a tangentially disposed feed pipe 2 to a vortex chamber 1, which, in the present example, has been designed as a cyclone. Immediately before the water enters the cyclone, the solution, from which e.g. a polymer or copolymer must be isolated, is contacted with the water by adding the solution to it via a line 3 with the result that the dissolved substance is transformed into solid particles. The water and the organic substances produce a vortex in vessel 1, consisting of an outer water layer 4 and an organic layer with solvent 5 around a hollow core 6. The solvent evaporated from the organic layer issues from the installation via core 6 and line 7, whereas the water with the solid particles suspended in it issues from the cyclone through an aperture 8, to be collected in a tank 9. Water and solid particles are discharged from said tank along a line 10. Part of the water, in which also solid particles may be present, is recycled via a line 11 and pump 12. This ensures that the feed to vortex chamber 1 will be large enough for producing the required vortex without consumption of an unduly large amount of water. If desired, an agitator, indicated by 13, may be provided to keep the solid particles suspended in vessel 9. 14 is a heating unit for heating the recycling water to the required temperature.

Figure 2:
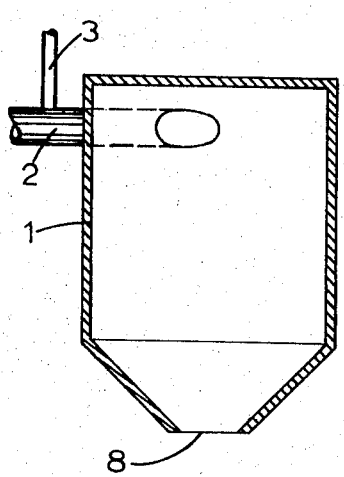
Figure 3:
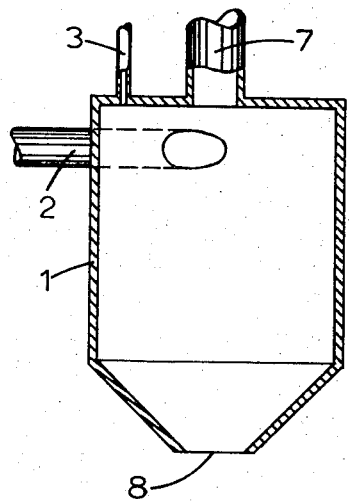
Figure 4:
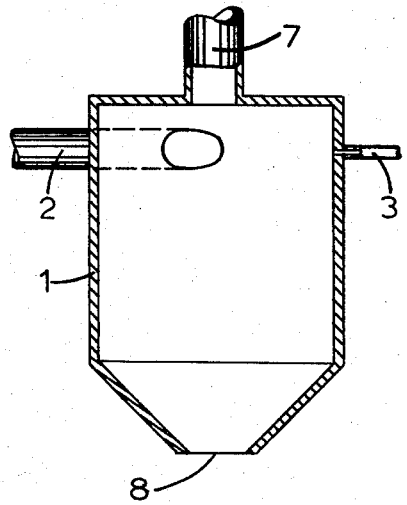
Figure 5:
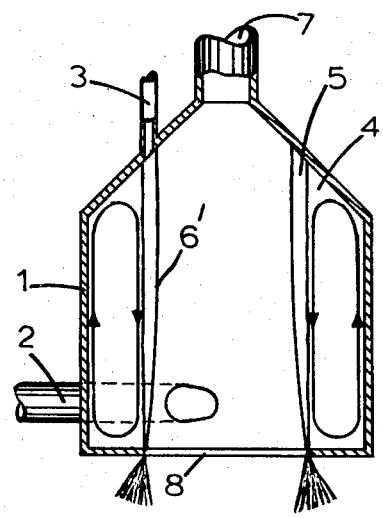

In FIGS. 2, 3 and 4 several ways are illustrated for supplying the polymer solutions via line 3 and discharging the solvent vapour via line 7. The reference marks in these figures correspond to those in FIG. 1. In the embodiment shown in FIG. 2 the polymer solution is added to the water immediately before it enters vessel 1; the vapour is carried off through aperture 8. In the embodiment of FIG. 3 the solution is directly supplied to the vessel through an axially disposed feed pipe and delivered into the water phase, whereas in FIG. 4 it is supplied through a radially disposed feed pipe. The solvent vapor may be discharged either through the top or through the base of the vessel, as is illustrated in FIG. 2 and FIGS. 3 and 4 respectively. FIG. 5 shows another variant; here, feed pipe 2 is fitted to the base of vessel 1. A fast vortex flow, indicated by the arrows, is produced in the water phase 4. Feed line 3 for the organic solution is disposed approximately on the contact interface plane between water phase 4 and organic phase 5, and debouches into the water at a point near the interphase between the liquid phase and the hollow core. So the organic solution introduced through line 3 is first dispersed in the water under the influence of the flow in the vortex and then separated from it.

We claim:

1. In a process for recovering particles of hydrocarbon polymers from an organic solvent solution thereof by dispersing said solution into an aqueous liquid phase and evaporating the organic solvent by transfer of heat from said aqueous liquid phase to said organic solvent, said organic solvent having a specific gravity lower than that of said aqueous liquid phase, the improvements which consist essentially of the combination of steps of (a) introducing said aqueous liquid phase into a vortex chamber near the periphery thereof and at a velocity and flow volume sufficient to create a vortically flowing aqueous phase within said vortex chamber, with formation of a vortex and an axially disposed hollow core, and at a temperature near the boiling point of said organic solvent, and (b) introducing said organic solvent solution into said vortex chamber at a point adjacent to the periphery of the cylindrical side wall of said vortex chamber to first disperse said organic solvent solution in said hot vortically flowing aqueous phase, whereby (c) the centrifugal forces created by said vortically flowing aqueous phase (1) form an inner organic phase disposed between said vortically flowing aqueous phase and said hollow core of said vortex while at the same time (2) causing transfer of heat from said aqueous liquid phase to said organic solvent in sufficient amount to induce vaporization of said organic solvent, said vaporization occurring substantially exclusively at the interface between said hollow core and said inner organic phase; and separately removing from said vortex chamber the vapors of said organic solvent substantially free of water vapor, and said polymer particles suspended in said aqueous phase substantially free of said organic solvent.

2. Process according to claim 1 characterized in that the organic solvent solution is added to the aqueous liquid phase immediately before said aqueous liquid phase enters the vortex chamber.

3. Process according to claim 1 characterized in that the organic solvent solution is supplied to the vortex chamber through an axially disposed feed pipe and delivered into the aqueous liquid phase.

4. Process according to claim 1 characterized in that the organic solvent solution is supplied to the vortex chamber through a radially disposed feed pipe.

5. Process according to claim 1 characterized in that the aqueous liquid phase is supplied to the vortex chamber through a tangentially disposed feed pipe.

References Cited

UNITED STATES PATENTS

| | | | |
|---|---|---|---|
| 2,969,347 | 1/1961 | Bellinger et al. | 260—94.9 |
| 2,977,351 | 3/1961 | Wiley | 260—94.9 |
| 3,234,995 | 2/1966 | Van Den Berg et al. | 159—47 |
| 3,303,180 | 2/1967 | Beckman et al. | 260—94.7 |
| 3,306,342 | 2/1967 | DiSalvo et al. | 159—47 |

JAMES A. SEIDLECK, Primary Examiner

S. M. LEVIN, Assistant Examiner

U.S. Cl. X.R.

260—80.7, 85.3 R, 88.2 B, 94.2 R, 94.9 F